United States Patent
Castellanos Zamora et al.

(10) Patent No.: US 12,512,985 B2
(45) Date of Patent: Dec. 30, 2025

(54) HANDLING USIMS WITH MISCONFIGURED ROUTING IDS IN 5GC

(71) Applicant: TELEFONAKTIEBOLAGET LM ERICSSON (PUBL), Stockholm (SE)

(72) Inventors: David Castellanos Zamora, Madrid (ES); Prajwol Kumar Nakarmi, Sollentuna (SE); Peter Hedman, Helsingborg (SE); Jesus Angel De Gregorio Rodriguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 577 days.

(21) Appl. No.: 17/279,017

(22) PCT Filed: Sep. 24, 2019

(86) PCT No.: PCT/IB2019/058059
§ 371 (c)(1),
(2) Date: Mar. 23, 2021

(87) PCT Pub. No.: WO2020/065502
PCT Pub. Date: Apr. 2, 2020

(65) Prior Publication Data
US 2022/0060325 A1 Feb. 24, 2022

Related U.S. Application Data

(60) Provisional application No. 62/735,692, filed on Sep. 24, 2018.

(51) Int. Cl.
*H04L 9/30* (2006.01)
*H04W 8/20* (2009.01)
*H04W 12/04* (2021.01)

(52) U.S. Cl.
CPC ............... *H04L 9/30* (2013.01); *H04W 8/20* (2013.01); *H04W 12/04* (2013.01)

(58) Field of Classification Search
CPC ............ H04W 12/04; H04W 8/20; H04L 9/30
See application file for complete search history.

(56) References Cited

U.S. PATENT DOCUMENTS 7,552,440 B1 * 6/2009 Stewart .................. G06F 9/544
709/213
11,985,497 B2 * 5/2024 Yan ....................... H04W 12/02
(Continued)

FOREIGN PATENT DOCUMENTS

RU 200914352 A 5/2011

OTHER PUBLICATIONS

"LS on Routing ID". 3GPP TSG SA WG2 #128bis, S2-188870, Aug. 20-24, 2018, Sophia Antipolis.
(Continued)

*Primary Examiner* — Gary S Gracia
(74) *Attorney, Agent, or Firm* — Sage Patent Group

(57) ABSTRACT

Systems and methods are described for redirecting a user equipment with a routing misconfiguration. An exemplary method includes detecting a potential misconfiguration associated with the user equipment or a subscriber identity module (SIM) associated with the user equipment and generating an error code indicating the potential misconfiguration associated with the user equipment of the SIM associated with the user equipment. The error code is transmitted to an authentication module and indicates that the misconfiguration is an incorrect routing identifier and includes additional user information.

20 Claims, 12 Drawing Sheets

(56) References Cited

U.S. PATENT DOCUMENTS

| | | | |
|---|---|---|---|
| 12,375,912 B2* | 7/2025 | Long | H04W 12/06 |
| 2012/0063300 A1* | 3/2012 | Sahin | H04W 36/12 |
| | | | 370/410 |
| 2015/0296378 A1* | 10/2015 | Plestid | H04W 8/12 |
| | | | 455/411 |
| 2017/0026481 A1* | 1/2017 | Stephan | H04L 63/0281 |
| 2017/0149626 A1* | 5/2017 | Yoon | H04L 41/069 |
| 2017/0310592 A1* | 10/2017 | Synnergren | H04L 45/38 |
| 2017/0353939 A1* | 12/2017 | Behera | H04W 76/18 |
| 2018/0279214 A1* | 9/2018 | Chandramouli | B62D 63/02 |
| 2019/0007500 A1* | 1/2019 | Kim | H04L 67/141 |
| 2019/0029065 A1* | 1/2019 | Park | H04W 60/00 |
| 2019/0036697 A1* | 1/2019 | Jerichow | H04L 9/3226 |
| 2019/0098502 A1* | 3/2019 | Torvinen | H04W 12/0433 |
| 2019/0223250 A1* | 7/2019 | Dao | H04W 72/23 |
| 2019/0260632 A1* | 8/2019 | Mishra | H04L 43/20 |
| 2019/0268806 A1* | 8/2019 | Zhu | H04W 28/0247 |
| 2020/0112906 A1* | 4/2020 | Chaponniere | H04W 40/248 |
| 2020/0267544 A1* | 8/2020 | Nakarmi | H04W 8/22 |
| 2020/0389865 A1* | 12/2020 | Kunz | H04W 8/12 |
| 2020/0396000 A1* | 12/2020 | Ryu | H04W 76/25 |
| 2021/0168751 A1* | 6/2021 | Stojanovski | H04W 60/00 |
| 2021/0258797 A1* | 8/2021 | Chandramouli | H04W 8/26 |
| 2022/0038911 A1* | 2/2022 | Verma | H04W 12/06 |
| 2022/0060325 A1* | 2/2022 | Castellanos Zamora | |
| | | | H04W 12/40 |
| 2024/0323681 A1* | 9/2024 | Sikes | H04W 12/069 |

OTHER PUBLICATIONS

China Mobile, "Clarification of URSP update if the traffic is not routed correctly", 3GPP TSG-SA WG2 Meeting #127-bis, S2-185055, May 28-Jun. 1, 2018, Newport Beach, USA.

Ericsson, "Handling UE/USIM with Misconfigured Routing Indicator", 3GPP TSG SA WG2 Meeting #129BIS, S2-1811927, Nov. 26-30, 2018, West Palm Beach, U.S.

ETSI TS 123 501 V15.3.0, 5G; System Architecture for the 5G System; (3GPP TS 23.501 version 15.3.0 Release 15) Sep. 2018.

ETSI TS 123 502 V15.3.0, 5G; Procedure for the 5G System; (3GPP TS 23.502 version 15.3.0 Release 15) Sep. 2018.

ETSI TS 129 510 V15.1.0, 5G; 5G System; Network function repository services; Stage 3, (3GPP TS 29.510 version 15.1.0 Release 15) Oct. 2018.

Nokia, "UDM and SIDF discovery", 3GPP TSG SA WG3 (Security) Meeting #90Bis, S3-180767, Feb. 26-Mar. 2, 2018, San Diego, US.

Office Action dated Jan. 30, 2024 for Chinese Patent Application No. 201980062575.7, 9 pages.

* cited by examiner

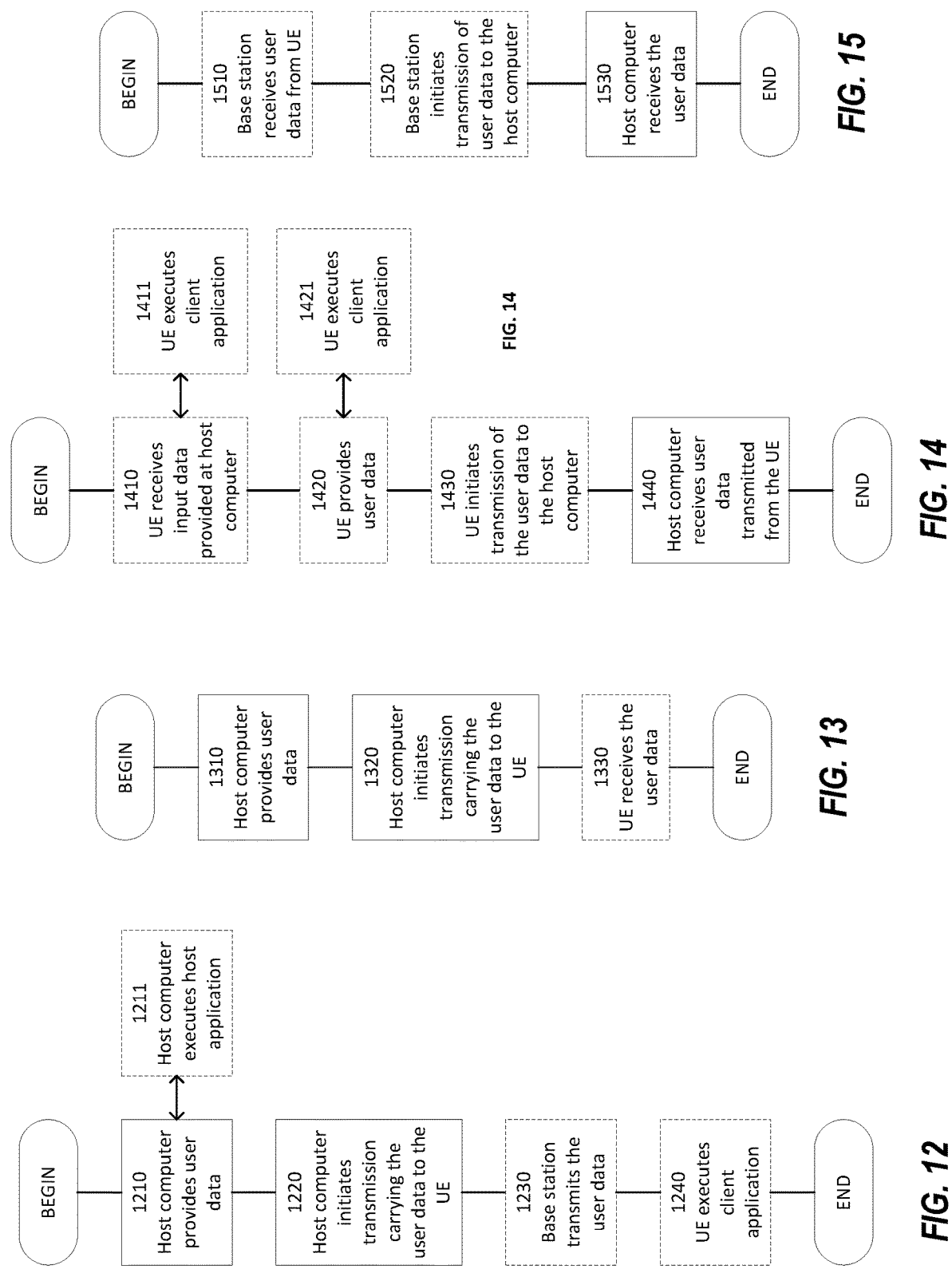

HANDLING USIMS WITH MISCONFIGURED ROUTING IDS IN 5GC

PRIORITY INFORMATION

This application is a national stage application of International Patent Application No. PCT/IB2019/058059, filed Sep. 24, 2019, which claims priority to and the benefit of U.S. Provisional Patent Application No. 62/735,692, filed Sep. 24, 2018, entitled "Handling USIMs with Misconfigured Routing IDs in 5GC," the disclosure of which are hereby incorporated herein by reference in their entirety.

TECHNICAL FIELD

This application relates to the field to cellular telecommunication networks. More specifically, the application relates to configuration of routing IDs in such networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

3GPP is currently standardizing the 5G Core Network (5GC) as part of the overall 5G System architecture. The 5G Core Network is standardized in 3GPP TS 23.501 (v. 15.3.0) and 3GPP TS 23.502. (v. 15.3.0). It is composed of a set of relevant functional entities, called Network Functions (NFs). 3GPP TS 23.501 defines the 5G System Architecture as a Service Based Architecture (SBA) for the control plane, i.e. a system architecture in which the system functionality is achieved by a set of NFs providing services to other authorized NFs to access their services. Control Plane (CP) NFs in the 5G System architecture are based on SBA. An NF service is one type of capability exposed by a first NF (NF Service Producer) to a second, authorized NF (NF Service Consumer) through a service-based interface (SBI). An NF service may support one or more NF service operations. An SBI represents how the set of services is provided or exposed by a given NF. This is the interface where the NF service operations are invoked, and it is based on HTTP/2 protocol.

An example of the 5G System reference architecture as defined in 3GPP TS 23.501, showing service-based interfaces used within the Control Plane, is depicted in FIG. 1 (not all NFs are depicted).

The Network Repository Function (NRF) is a key NF within the 5GC SBA Framework that provides support to service providers to register their services so that service consumers can dynamically discover them. The service discovery function enabled by NRF provides the address of the NF instances that exist in a network for providing a service and all necessary information to issue and route requests towards the selected target NF producer (i.e. protocol, port, FQDN and/or IP address of target NF instance amongst other parameters required to create a URI used in the http request). The NF interactions with the NRF for registration and discovery may be mostly be managed as background traffic independent from the traffic related to UE procedures.

Some deployments of 5GC may define segments of Authentication User Function (AUSF), Unified Data Management (UDM), and/or Unified Data Repository (UDR) for managing different sets of users within the Home Public Land Mobile Network (HPLMN), e.g., in case of regional AUSF/UDM/UDR deployments facilitating the administration of the subscription base within large PLMNs). For these scenarios, 3GPP has defined the possibility for AUSF/UDM/UDR to register in NRF using segment parameters provided to NF consumers during AUSF/UDM/UDR discovery to facilitate the selection of the right AUSF/UDM/UDR instance for a given UE procedure.

These segment parameters are defined in 3GPP TS 29.510 (v. 15.1.0) and can include the following as shown below in Table TT1.

TABLE TT1

| Attribute name | Data type | P | Cardinality | Description |
|---|---|---|---|---|
| groupId | String | O | 0 . . . 1 | Identity of the AUSF/UDM/UDR group that is served by the AUSF/UDM/UDR instance |
| supiRanges | Array (SupiRange) | O | 0 . . . N | List of ranges of SUPIs whose profile data is available in the AUSF/UDM/UDR instance (NOTE 1) |
| gpsiRanges | Array (IdentityRange) | O | 0 . . . N | List of ranges of GPSIs whose profile data is available in the UDM/UDR instance (NOTE 1) |
| externalGroupIdentifiersRanges | Array (IdentityRange) | O | 0 . . . N | List of ranges of external groups whose profile data is available in the UDM/UDR instance (NOTE 1) |

TABLE TT1-continued

| Attribute name | Data type | P | Cardinality | Description |
| --- | --- | --- | --- | --- |
| routingIndicators | Array (string) | O | 0 ... N | List of Routing Indicator information that allows to route network signalling with SUCI to the AUSF/UDM instance. |

NOTE

1: If none of these parameters is provided, the AUSF/UDM/UDR can serve any external group and any SUPI or GPSI.

In particular, the Routing Indicator is of relevance during initial interactions with the UE as it is included within the SUCI provided by a UE when the privacy feature is active.

The use of the Routing Indicator to route the UE authentication requests to the right AUSF/UDM/UDR segment of the UE represented by the SUCI is illustrated in the following figure.

With reference to FIG. 2, a PLMN may deploy separate AUSF/UDM/UDR segments managing different segments of subscribers, e.g., regional setups. As shown in FIG. 2, AUSF/UDM/UDR discovery/selection based on segment parameters may be realized by (a) UDR, UDM, and/or AUSF can register in the PLMN/(Network Slice Selection Assistance Information) NSSAI level NRF including relevant segment parameters; (b) serving notes discover, via NRF, registered instances of AUSF/UDM/UDR available at, e.g., PLMN ID, NSSAI, etc. (1) During UE procedure, serving node may select an applicable AUSF/UDM/UDR instance based on NRF information retrieved in (b). (1b) the serving node can make a subscription permanent identifier (SUPI) based discovery request if not enough information is available to resolve to the desired AUSF/UDM/UDR. For example, this may be done in roaming cases or if a segment parameter becomes too scattered such that it cannot be used for registration or discovery. A routing database may keep an association of individual SUPI/GPSIs with AUSF/UDM/UDR segment parameters if needed. (2) the serving node selects and interacts thereafter with target AUSF/UDM/UDR.

There currently exist certain challenges. The mechanisms to route the UE authentication requests to the right AUSF/UDM/UDR segment of the UE represented by the Subscription Concealed Identifier (SUCI) based on the Routing Indicator illustrated in FIG. 2 are based on defined discovery and selection procedures. These however assumes that the UE is providing a correct Routing ID which corresponds with the actual configuration in the different AUSF/UDM/UDR segments within the HPLMN.

However, if UE/SIMs are provisioned with an incorrect Routing ID the selected UDM will reject the Authentication Request with an "HN Public Key ID Not Supported" type of error if HN Public Key ID is not supported in the selected UDM (e.g., the SUCI cannot be decrypted) or an "UNKNOWN USER" type of error when the UDM is unable to find SUPI in UDR. In the Subscriber Identity Modules (SIMs) may be referred to as herein as a Universal Subscriber Identity Modules (USIMs).

FIG. 3 depicts a misconfiguration of a routing ID of a UE. UE procedures include information flows that (authentication in the first place) may be routed to the AUSF/UDM/UDR segment based on the routing ID provided (e.g. segment 2). The Access and Mobility Management Function (AMF) may issue an authentication request including the SUCI to one of the AUSF instances matching the routing ID provided by the UE. It may be assumed that there are multiple AUSF/UDM/UDR instances registered in the PLMN for the routing ID provided by the UE. Otherwise, the AMF will reject the UE registration.

However, if UE/SIMs are provisioned with an incorrect routing ID the selected you DM may reject the authentication request with an "HN Public Key ID Not Supported" error or an "UNKNOWN USER" error.

A potential approach may be to utilize a mechanism to update the routing ID in the misconfigured UE/SIMs. However, there is a need to allow this type of wrongly configured UEs to connect to the core network so that they can be properly configured afterwards. Certain aspects of the present disclosure and their embodiments may provide solutions to these or other challenges.

SUMMARY

The following clauses represent some embodiments of the systems and methods of the present disclosure. The features of the embodiments below may be combined in additional embodiments. Some embodiments may omit one or more features of the enumerated embodiments.

Group A Embodiments

1. A method for redirecting a user equipment with a routing misconfiguration, the method comprising: detecting a potential misconfiguration associated with the user equipment or a subscriber identity module (SIM) associated with the user equipment; and generating an error code indicating the potential misconfiguration associated with the user equipment of the SIM associated with the user equipment.

2. The method of embodiment 1 further comprising the steps of: transmitting the error code to an authentication module.

3. The method of any of the preceding embodiments, wherein the error code indicates that the misconfiguration is an incorrect routing identifier and includes additional user information.

4. The method of any of the preceding embodiments, wherein the additional user information includes a subscription identity associated with the user equipment or SIM.

5. The method of any of the preceding embodiments, wherein: the potential misconfiguration is an incorrect routing identifier; and detecting the potential misconfiguration comprises detecting that a subscription identifier associated with the user equipment or the SIM is unknown or unrecognized.

6. The method of any of the preceding embodiments, wherein: the potential misconfiguration is an incorrect routing identifier; and detecting the potential misconfiguration comprises detecting an unknown home network public key.

7. The method of any of the preceding embodiments, wherein: detecting the potential misconfiguration associated with the user equipment or the SIM is performed in response to an access request transmitted by the user equipment.

8. The method of any of the preceding embodiments, wherein: an authentication module directs the access request to a first functional module based on the incorrect routing identifier included in the access request.

9. The method of any of the preceding embodiments, wherein: the authentication module redirects the access request to a second functional module is based on the generated error code or information included with the generated error code; and the second functional module authenticates or registers the user equipment or SIM.

10. The method of any of the preceding embodiments, wherein the first functional module comprises a first authentication server function (AUSF) module and the second module comprises a second AUSF module.

11. The method of any of the preceding embodiments, wherein the first functional module comprises at least one of a first AUSF module, a first unified data management (UDM) module, or a first unified data repository (UDR) module.

12. The method of any of the preceding embodiments, wherein the second functional module comprises at least one of a second AUSF module, a second unified data management (UDM) module, or a second unified data repository (UDR) module.

13. The method of any of the preceding embodiments, where in the authentication module comprises an access and mobility management functions (AMF) module.

14. The method of any of the preceding embodiments, further comprising determining that the user equipment is managed by another network segment within an associated home public land mobile network.

15. The method of any of the preceding embodiments, wherein determining that the user equipment is managed by another network segment comprises performing a check of the subscription permanent identifier associated with the user equipment and or a home network public key identifier associated with the user equipment.

16. The method of any of the preceding embodiments, wherein a private key that matches the home network public key identifier is not present in the network segment.

Group B Embodiments

1. A method for correcting a user equipment of SIM misconfiguration, the method comprising: receiving, via a wireless transmission, a request from a user equipment to connect to a core network; selecting an authentication server for authentication of the user equipment based on a routing identifier provided by the user equipment, where in the authentication server is part of a first network segment; receiving an error message from the authentication server, the error code indicating that the routing identifier is misconfigured; selecting a new authentication server for authentication of the user equipment based on the error message and/or information included in the error message; and sending an authentication request to the new authentication server for authentication of the user equipment, wherein the new authentication server as part of a second network segment.

2. The method of embodiment 1, wherein the authentication request comprises information included in the error message.

3. The method of embodiment 2, wherein the authentication server generates the error message when a subscription permanent identifier is not resolved by the authentication server or is not found in a unified data repository associated with the authentication server.

4. The method of any of the preceding embodiments, further comprising sending an initial authentication request to the authentication server.

5. The method of any of the preceding embodiments, wherein the initial authentication request comprises a Nausf_UEAuthentication_Authenticate request.

6. The method of any of the preceding embodiments, wherein the authentication server sends a request to an associated unified data management (UDM) instance in response to the initial authentication request.

7. The method of any of the preceding embodiments, wherein the request to the associated UDM instance comprises a Nudm_UEAuthentication_Get request.

Group C Embodiments

1. A core network authentication system for authenticating wireless user equipment to a core network, the core network authentication system comprising: a memory having instructions stored thereon; and processing circuitry, wherein the processing circuitry implements the instructions to perform operations comprising: detecting a potential misconfiguration associated with the user equipment or a subscriber identity module (SIM) associated with the user equipment; and generating an error code indicating the potential misconfiguration associated with the user equipment of the SIM associated with the user equipment.

2. The core network authentication system, wherein the processing circuitry is configured by the instructions to perform other functions as described with respect to the embodiments of group A above.

Group D Embodiments

1. A core network authentication system for authenticating wireless user equipment to a core network, the core network authentication system comprising: a memory having instructions stored thereon; and processing circuitry, wherein the processing circuitry implements the instructions to perform operations comprising: receiving, via a wireless transmission, a request from a user equipment to connect to a core network; selecting an authentication server for authentication of the user equipment based on a routing identifier provided by the user equipment, where in the authentication server is part of a first network segment; receiving an error message from the authentication server, the error code indicating that the routing identifier is misconfigured; selecting a new authentication server for authentication of the user equipment based on the error message and/or information included in the error message; and sending an authentication request to the new authentication server for authentication of the user equipment, wherein the new authentication server as part of a second network segment.

2. The core network authentication system, wherein the processing circuitry is configured by the instructions to perform other functions as described with respect to the embodiments of group B above.

Group E Embodiments

1. A non-transitory, tangible computer readable medium having instructions stored thereon that, when executed by processing circuitry, cause the processing circuitry to perform operations comprising: detecting a potential misconfiguration associated with the user equipment or a subscriber identity module (SIM) associated with the user equipment; and generating an error code indicating the potential misconfiguration associated with the user equipment of the SIM associated with the user equipment.

2. The computer readable medium above, wherein execution of the instructions stored thereon cause the processing circuitry to perform other functions as described with respect to the embodiments of group A above.

Group F Embodiments

1. A non-transitory, tangible computer readable medium having instructions stored thereon that, when executed by processing circuitry, cause the processing circuitry to perform operations comprising: receiving, via a wireless transmission, a request from a user equipment to connect to a core network; selecting an authentication server for authentication of the user equipment based on a routing identifier provided by the user equipment, where in the authentication server is part of a first network segment; receiving an error message from the authentication server, the error code indicating that the routing identifier is misconfigured; selecting a new authentication server for authentication of the user equipment based on the error message and/or information included in the error message; and sending an authentication request to the new authentication server for authentication of the user equipment, wherein the new authentication server as part of a second network segment.

2. The computer readable medium above, wherein execution of the instructions stored thereon cause the processing circuitry to perform other functions as described with respect to the embodiments of group B above.

BRIEF DESCRIPTION OF DRAWINGS

The present disclosure includes the following figures:

FIG. 12 depicts a flowchart of a method implemented in a communication system including a host computer, a base station and a user equipment in accordance with some embodiments.

FIG. 13 depicts a flowchart of a method implemented in a communication system including a host computer, a base station and a user equipment in accordance with some embodiments.

FIG. 14 depicts a flowchart of a method implemented in a communication system including a host computer, a base station and a user equipment in accordance with some embodiments.

FIG. 15 depicts a flowchart of a method implemented in a communication system including a host computer, a base station and a user equipment in accordance with some embodiments.

These figures will be better understood by reference to the following detailed description of the embodiments.

DESCRIPTION OF EMBODIMENTS

This disclosure provides for a mechanism or mechanisms for UE/USIMs which are configured with a wrong Routing ID to be redirected to the right AUSF/UDM/UDR set that the UE belongs to, so they can authenticate and register in the core network and later be updated with a correct Routing ID. An exemplary embodiment is shown in FIG. 4.

Figure 4:
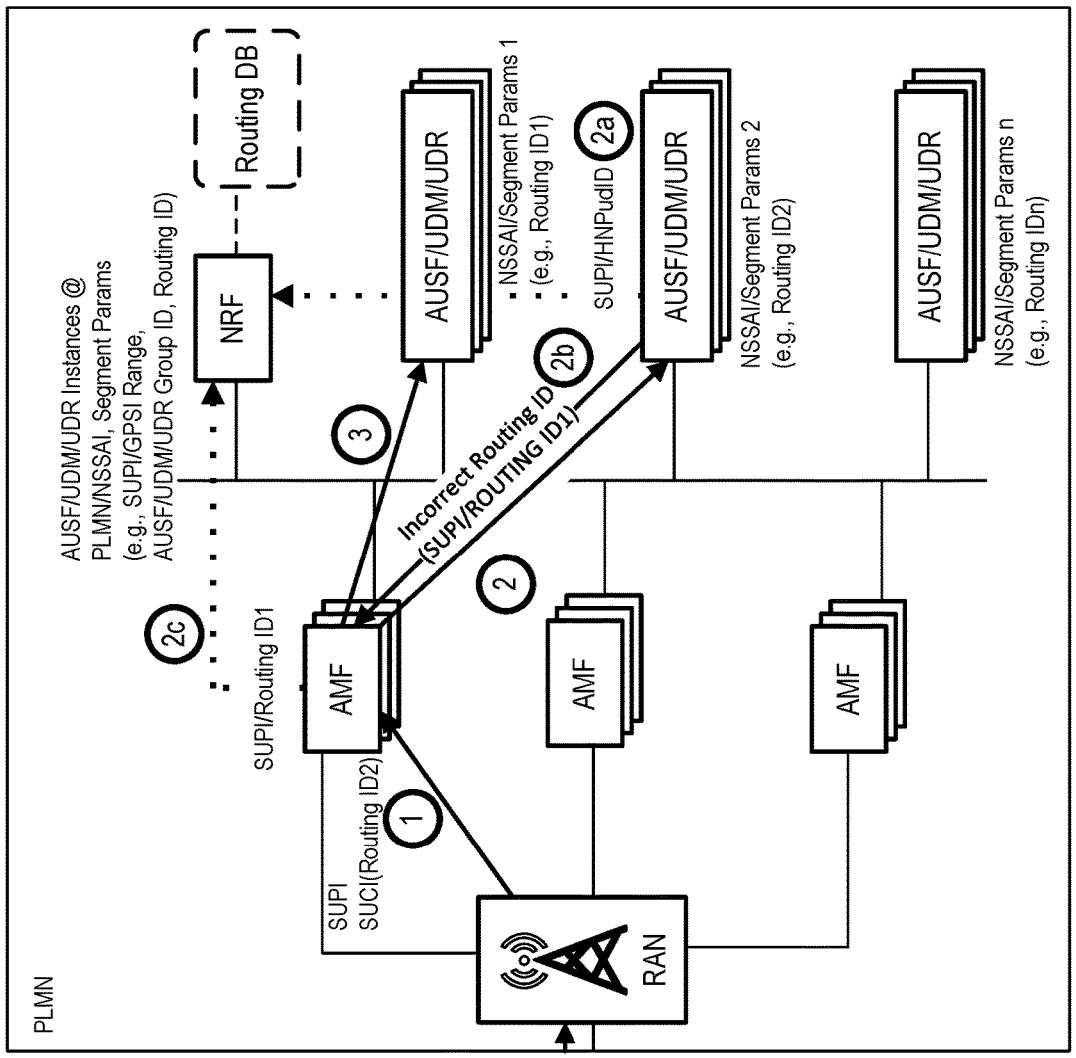
FIG. 4 depicts the redirection of misconfigured UE/USIMS to correct AUSF/UDM/UDR segment.

FIG. 4 depicts the redirection of misconfigured UE/USIMS to correct AUSF/UDM/UDR segment according to some embodiments of the present disclosure. The mechanism for redirection/correction is based on detection at the UDM/SIDF of possible UE/SIM misconfiguration. This may be based on an unknown SUPI or unknown HN Public Key ID. The UDM may determine whether the SUPI and/or the HN Pub Key ID are/is defined elsewhere within the HPLMN. This may be done, for example, by interacting with the NRF based on the SUPI and/or HN Public Key ID, as shown at step 2a of FIG. 4. The UDM may reject the authentication request with a new error code, e.g., an "Incorrect Routing ID" error code, at step 2b. This may include additional information regarding the user, such as the SUPI, and/or information about the right AUSF/UDM instances to use, e.g., the correct routing ID. The AMF may make a new AUSF/UDM selection based on the information or criteria provided within the air. For example, the AMF may make the new AUSF/UDM selection based on the SUPI and/or the new routing ID. The AMF may query the NRF as part of this selection or information collection, at step 2c. The AMF may thereafter reach the correct AUSF/UDM/UDR segment where the user (the UE/USIM) is authenticated and/or registered, at step 3. Subsequently, the UE/USIM can be properly configured with the correct routing ID.

There are, proposed herein, various embodiments which address one or more of the issues disclosed herein.

Certain embodiments may provide one or more of the following technical advantage(s). The mechanism to redirect UE/USIMs which are configured with a wrong Routing ID to the right AUSF/UDM/UDR segment allows these misconfigured UE/USIMs to be able to authenticate and register in the 5GC in such a way that they can later be updated with a correct Routing ID. The mechanism may utilize on existing SBA services and just adds additional information elements and error codes relevant for the execution of the use case.

Without this mechanism provided herein, these UEs may remain locked-out from the system, since they will be rejected within the 5GC and will have to be updated with its right Routing ID by some other offline means (e.g. change/update of USIM at operator premises) with additional costs for the operator.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 5:
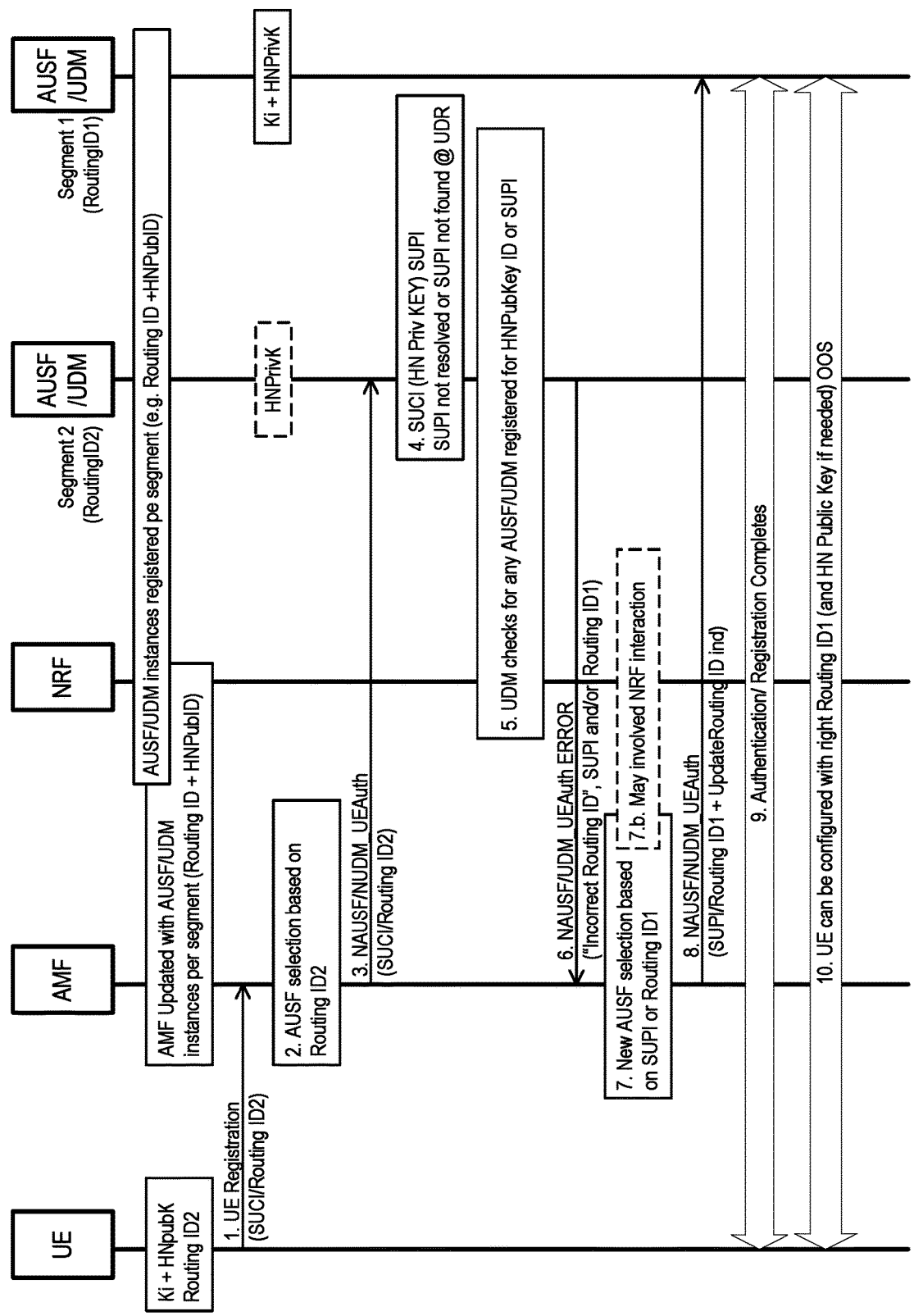
FIG. 5 depicts redirection of misconfigured UE/USIMs to the correct AUSF/UDM segment.

FIG. 5 shows more in detail the various of the solution proposed by this disclosure to redirect UE/USIMs which are configured with a wrong Routing ID to the right AUSF/UDM/UDR segment. On the 5GC side, the HPLMN may deploy segments of AUSF/UDM/UDR instances (e.g., segment #1 and segment #2) with each segment managing a different set of users within the HPLMN. That means that AUSF/UDMs of a given segment will not be able to authenticate/register a UE that belongs to a different segment, since the corresponding user profile will not be found within the segment. The AUSF/UDM/UDR in the different segments register in NRF using its segment parameters (e.g., Range of SUPI/GPSI, Group ID and/or Routing ID). Other NFs, such as AMF, can discover available AUSF/UDM/UDR instances per segment.

This may be done based on NRF registration/discovery mechanisms. In some embodiments, this may also be done using the HN Public Key ID also as segment parameter for AUSF/UDM/UDR registration and discovery if different HN Public/Private Keys for the privacy feature are also used in the different AUSF/UDM/UDR segments.

On the UE side, the USIM is configured to use the privacy feature (i.e. HN Public Key, Scheme) and a Routing ID which happens to be incorrect (e.g. Routing ID #2 configured in USIM corresponds with Segment #2 in the HPLMN while the user belongs to Segment #1). The operations providing the disclosed mechanism may be described as a series of operations or steps. Some embodiments of these operations may include additional or alternative operations in between, after, before, or as part of the enumerated operations.

At step one, the UE attempts to connect to the 5GC. For example, the UE of FIG. QQB may attempt to connect to the 5GC via an AMF. At step 2, the AMF may select an AUSF in Segment #2 of the PLMN to trigger primary authentication of the UE based on the Routing ID provided by the UE (i.e. Routing ID #2). At step 3, the AUSF may receive the request and send a corresponding request to a UDM instance. For example, the AUSF may receive the Nausf_UEAuthentication_Authenticate request and may send a Nudm_UEAuthentication_Get request to a UDM instance within its segment, segment #2.

At step 4, the UDM may receive receiving an authentication request including a SUCI and then attempt to resolve the corresponding SUPI in its role as SIDF. For that the UDM may require a HN Private Key corresponding to the HN Public Key ID used for the SUCI creation and included within the received SUCI. At this point, the UDM may either (a) not be able to decrypt the SUCI because it does not have the corresponding HN Private Key or (b) not be able to find the resulting SUPI in the UDR of its segment, segment #2.

At step 5, in this situation and before rejecting the authentication requests with an "UNKNOWN USER/HNPubKeyID" type of error, the UDM checks if the SUPI/HN Public Key ID provided by the UE is managed in any other AUSF/UDM/UDR segment within the HPLMN. In some embodiments, this may be done by UDM, which may query the NRF for available AUSF/UDM/UDR instances for the given SUPI/HN Public Key ID. A successful response from NRF may be considered by UDM as a potential situation of a misconfigured Routing ID at the UE/USIM. It should be noted that an unsuccessful response from NRF may be managed in the UDM as an "UNKNOWN USER" or an "HN Public Key ID" type of error. Accordingly, the AUSF/UDM/UDR discovery requests based may be based on SUPI, in some embodiments, based on HN Public Key ID in other embodiments. Thus, the disclosure provides for AUSF/UDM/UDR to register in NRF using this segment parameter so AMF/UDM/UDR would be able to discover available AUSF/UDM/UDR instances managing a given HN Public Key ID.

At step 6, instead of rejecting the authentication requests with an "UNKNOWN USER/HNPubKeyID" type of error, the UDM may reject the Nudm_UEAuthentication_Get request with a new error code which can indicate the error condition to the AMF. For example, the UDM may issue an "Incorrect Routing ID" error code. Additionally, the UDM may include additional information which can be utilized to facilitate the AMF in the selection of the AUSF in the right AUSF/UDM/UDR segment. Such additional information could be, e.g., the SUPI when the UDM is able to decrypt the SUCI, and/or the Routing ID, as received from the NRF, managed by the AUSF/UDM/UDR segment to which the UE belongs. The AUSF may also reject the Nausf_UEAuthentication_Authenticate request including the same error code (e.g., the "Incorrect Routing ID") and additional information accordingly.

At step 7, the AMF receives the authentication reject with the new error type, message, or indicator that indicates that an incorrect routing identifier is being used in associated with the UE. This error may be referred to as an "Incorrect Routing ID" error type. The AMF may then select a new AUSF instance to resend the authentication request to (or to send a new authentication request to) based on the additional information included in the error response. In some embodiments, at a step 7b, the AMF may query the NRF using the received SUPI/Routing ID if information regarding available AUSF instances matching those parameters is not available at the AMF.

At step 8, the AMF resends the Nausf_UEAuthentication_Authenticate request to the new AUSF selected this time in the right segment, segment #1, to which the UE belongs. The AUSF may send a corresponding Nudm_UEAuthentication_Get request to a UDM instance within its segment #2. These Nausf/Nudm_UEAuthentication requests may provide an additional indication to the UDM, so that the UDM can mark the UE subscription as pending to be updated with the right or correct Routing ID. This can be in the form of an explicit indicator, e.g., an "Update Routing ID indicator," and/or the wrong Routing ID value provided by the UE.

At step 9, the rest of the UE Authentication and Registration procedure may be completed using the right AUSF/UDM/UDR segment as currently defined.

At step 10, while the UE is connected within the 5GC, the HPLMN may update the Routing ID of the UE/USIM and, in some embodiments, also the HN Public Key if needed.

The same principles can be applied in situations in which the UE/USIM is not configured with a Routing ID when it should be. In this case, the AMF will select any available AUSF/UDM instance within the HPLMN and unless the selected AUSF/UDM instances happen to be in the right segment, the selected AUSF/UDM instance will detect the error situation (still an "incorrect or Missing Routing ID") and use the same mechanisms to route the UE to the right AUSF/UDM segment.

Some embodiments of the proposed solution provided in this disclosure make use of the NRF as a primary mechanism to allow UDM and other NFs in general to register and discover the services with the right granularity including segment parameters. However, the principles of this solution may be applied in other embodiments without using NRF by means of configuration of the available AUSF/UDM segment information at the AMF and UDM.

After a "wrong" UDM queries an NRF to know if SUPI/HN Public Key ID is managed by another UDM within the PLMN (as in step 5 above), the "wrong" UDM may include within the new error response to the AMF the information about AUSF/UDM instance(s) the AMF should use to redirect the authentication request so the AMF can skip further queries to NRF. Possible alternative mechanisms for the UDM to be able to check if the SUPI/HN Public Key ID provided by the UE is managed in any other AUSF/UDM segment within the HPLMN (again, as in step 5) are as depicted in FIG. 6.

Figure 6:
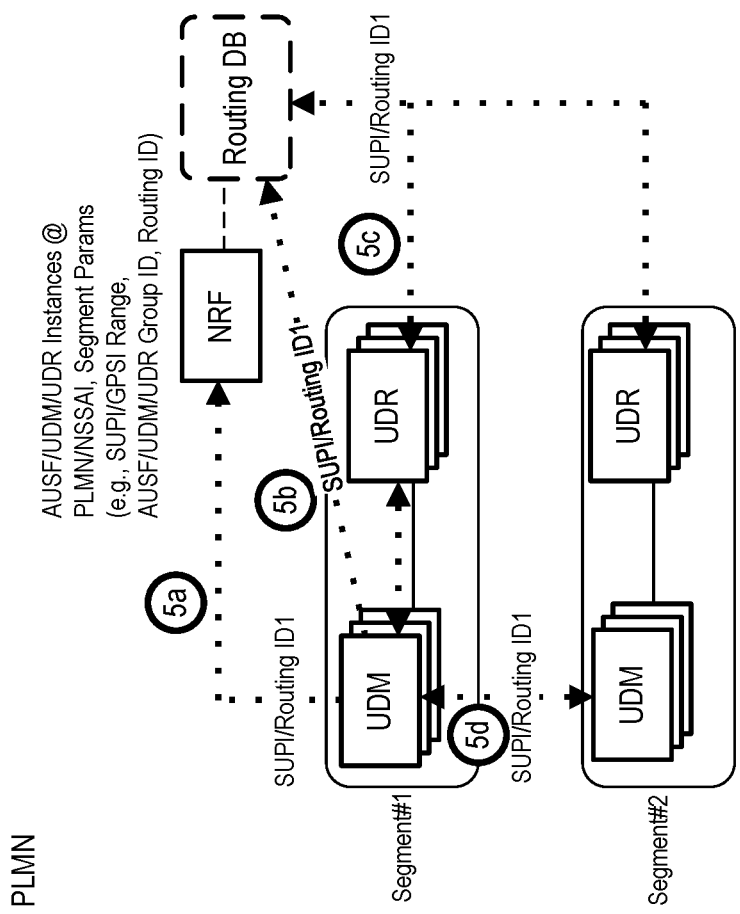
FIG. 6 depicts mechanisms for detecting a misconfigured UE.

FIG. 6 depicts alternative mechanisms for detecting a misconfigured UE. As shown in FIG. 6, the UDM may query a Routing DB which can keep the mapping of SUPI/HN Pub Key ID with the Routing ID and/or the AUSF/UDM Group ID, as in 5b above. This Routing DB may be the same one that supports the NRF during the registration and/or discovery procedures using these parameters.

The access to the Routing DB may be via the UDR within the same segment which would proxy the request towards the Routing DB, as in 5c above. The UDM may send a broadcast notification to other UDMs within PLMN to get ACK (and Routing ID) from the ones managing the given SUPI/HN Public Key ID, as in 5d.

According to latest version of 3GPP TS 29.510 [3] (v15.1.0) a given AUSF/UDM instance may be registered in the NRF supporting 0 to N Routing Indicators (i.e., different UE/USIMs configured with different Routing IDs may be served by the same AUSF/UDM instance). In such an embodiment, when the "wrong" UDM checks with the NRF if the SUPI/HN Public Key ID provided by the UE is served by any other AUSF/UDM within the PLMN, as in 5d, the NRF may provide a positive response including corresponding AUSF/UDM instances but also multiple Routing IDs supported by these instances. Based on this response, the UDM may be aware that the UE shall be managed by a different AUSF/UDM segment, but it will not be able to tell the AMF the exact Routing ID the UE should have used. To manage such a situation, we propose that if the "wrong" UDM preformed the discovery request using the SUPI, the NRF include the Routing ID assigned to the UE in the response. The NRF may determine the Routing ID of a given UE either by a local configuration in NRF of the mapping of SUPI Ranges to Routing ID, the NRF supported by a Routing DB including the mapping of SUPI Ranges and/or individual SUPIs with corresponding Routing IDs, the AUSF/UDM registering in the NRF explicitly the relation of supported SUPI Ranges with corresponding Routing IDs. If provided by the AUSF/UDM during registration, the NRF will be utilized to provide such information also during the AUSF/UDM discovery procedure.

Further, a procedure for triggering Routing Identifier update may open an avenue for a potential attack as follows. The attacker changes the Routing Identifier from the SUCI over-the-air to something other than the one sent by the UE. The network may notice a different Routing Identifier and trigger the Routing Identifier update procedure. This may result in an unnecessary signaling load in the network, which can get worse if the attacker changes the Routing Identifier from a large number of SUCIs over-the-air. Some, or in some instance all, of the UEs whose SUCIs were changed may consequently be updated unnecessarily. This may produce unwanted signaling over-the-air, unwanted processing in the UE, and delay in service access. And after the update has happened, the attacker may repeat the attack again. This may be possible because the root-cause of the above protection is the network not being able to detect that the received Routing Identifier is the one sent by the UE.

One solution for the above problem is to have the network keep track of expected Routing Identifier from UEs and detect the above attack. For example, if a UE has a SUPI_1 and a Routing_Identifier_3, and if the network has not updated that UE, then the network is able to detect the above attack if the network receives SUPI_1 (after decryption) and a Routing_Identifier_4. The network may include a mechanism to minimize the damage of such a potential attack by, e.g., having limits on how many times the Routing Identifier update procedure is triggered within a static time span or dynamically determined time span, for all UEs, or for particular UE, or for particular group of UEs, for particular network function (CN or RAN) like AMF.

Further, another solution for the above potential attack is that the UE integrity protects the Routing Identifier and the network verifies the integrity protection of the receiving Routing Identifier. For example, the UE when using Elliptic Curve Integrated Encryption Scheme (ECIES), could include at least the Routing Identifier, preferably in SharedInfo2 or in SharedInfo1 parameters. Then the network may cryptographically verify that the received Routing Identifier is indeed sent by the UE, i.e., with the help of a MAC-tag or a MAC key.

Figure 1:
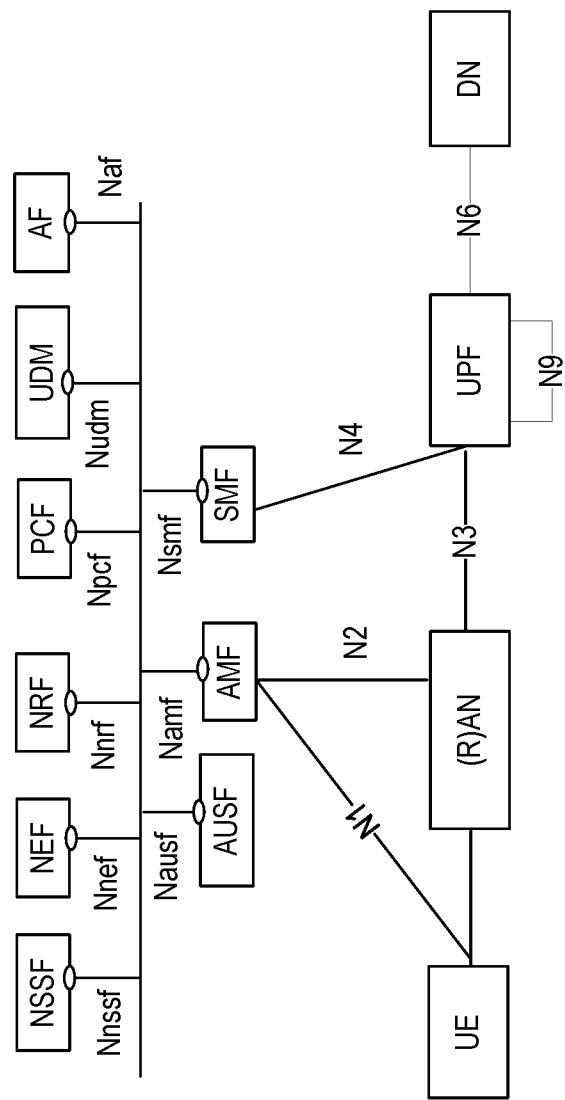
FIG. 1 depicts a 5G system architecture.
Figure 2:
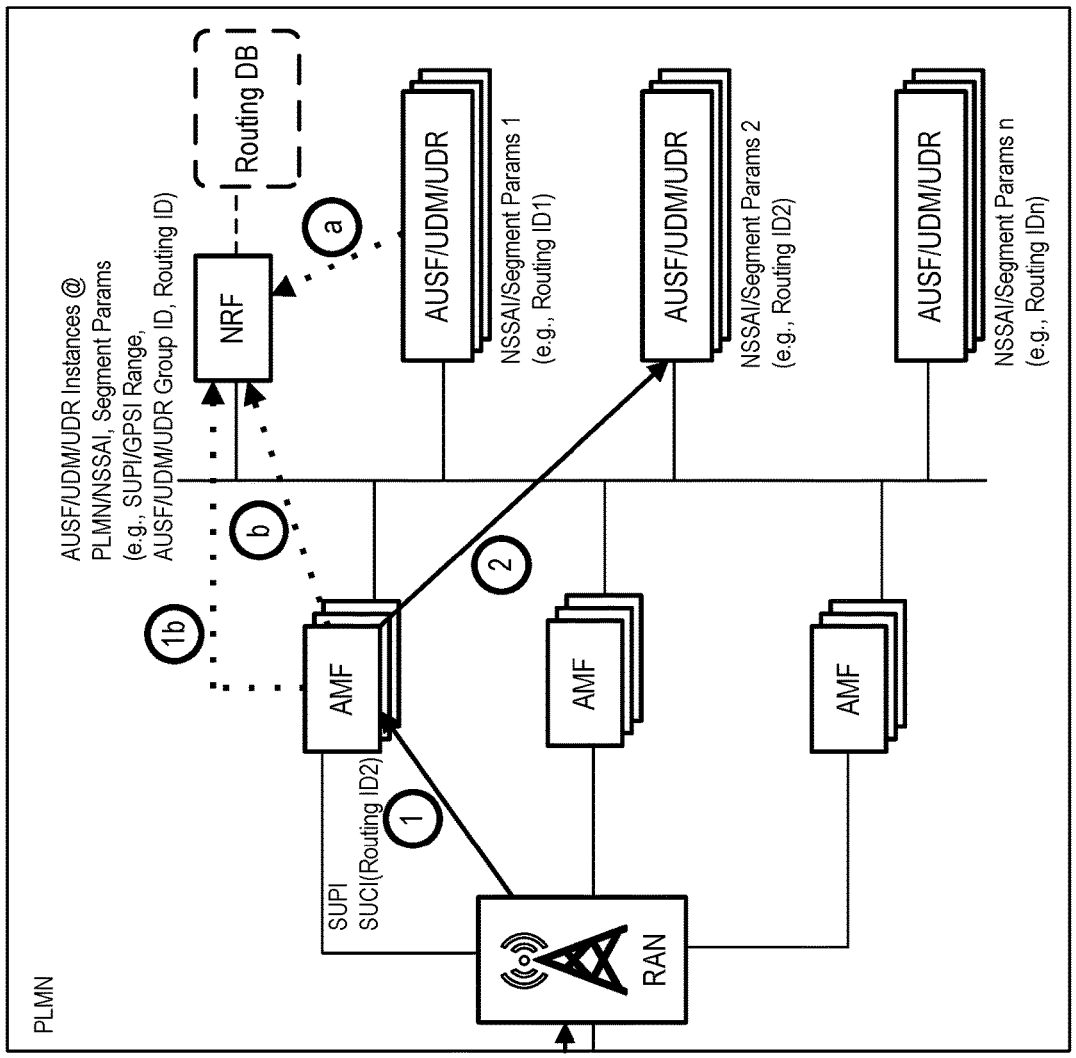
FIG. 2 depicts AUSF/UDM discovery and selection in an exemplary 5G system architecture.
Figure 3:
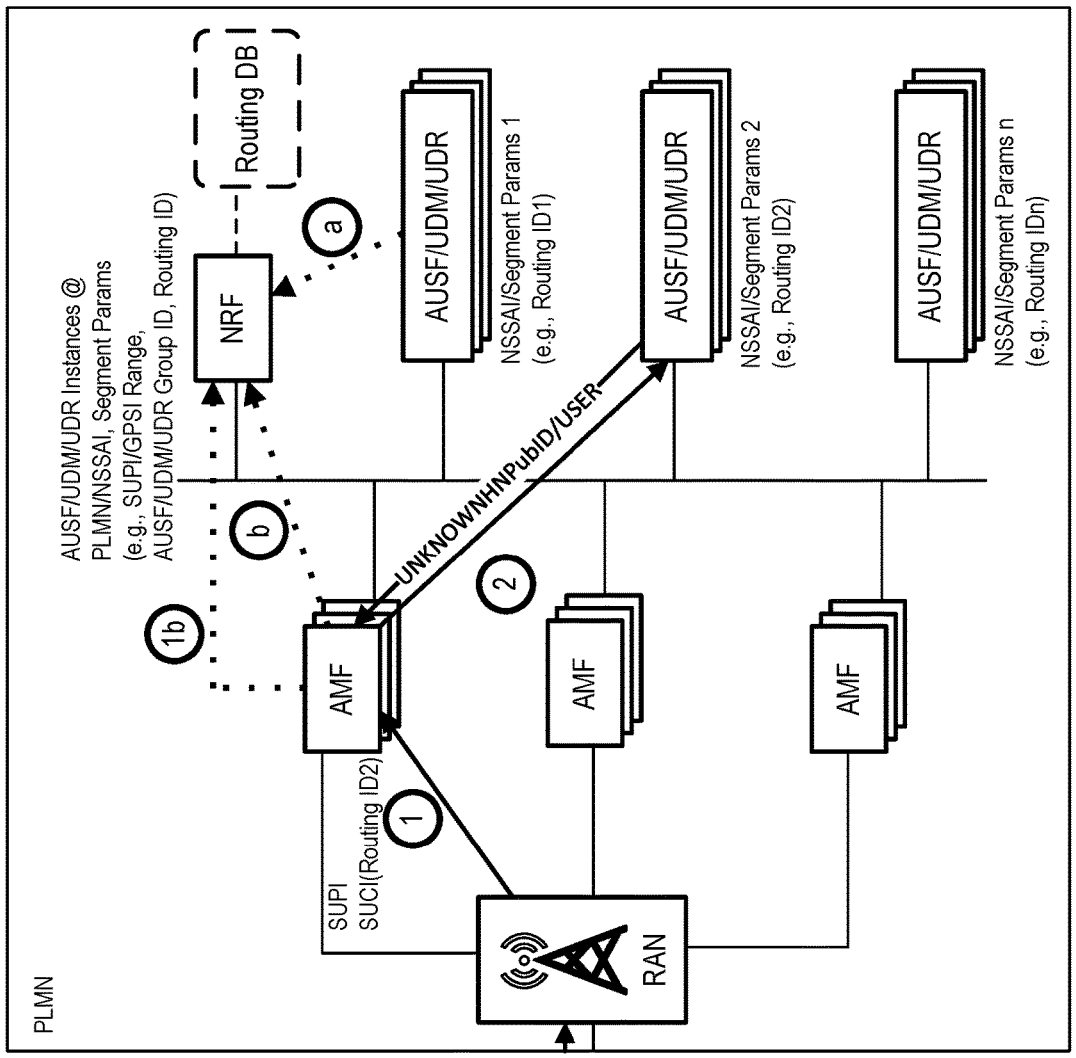
FIG. 3 depicts a misconfigured routing ID.
Figure 7:
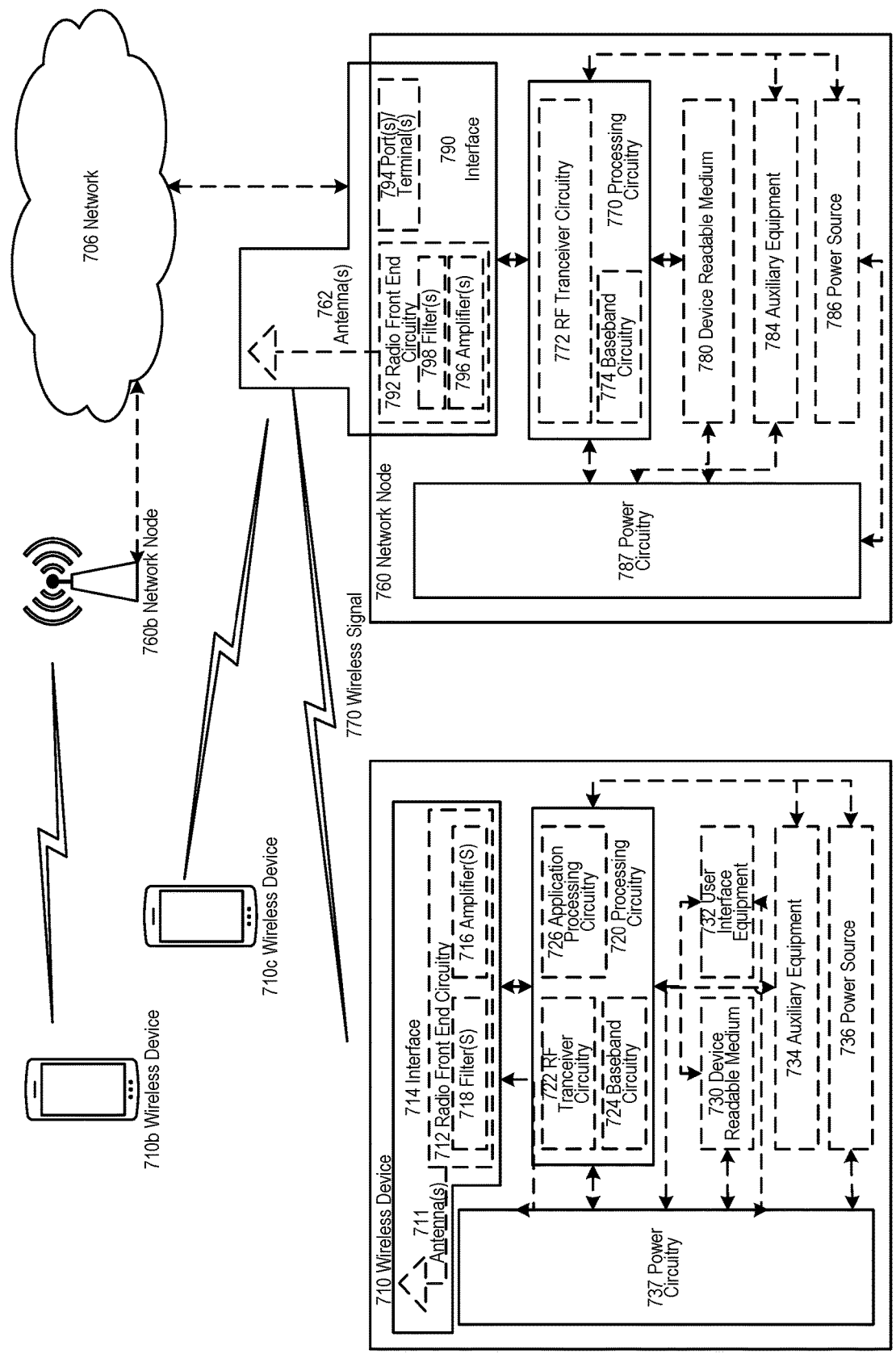
FIG. 7 depicts a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In many respects, the wireless network of FIG. 7 presents an alternative diagram of the network architecture shown in 1, with FIG. 1 providing additional detail with respect to the network 706. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units.

In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signaling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio interface 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 712 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
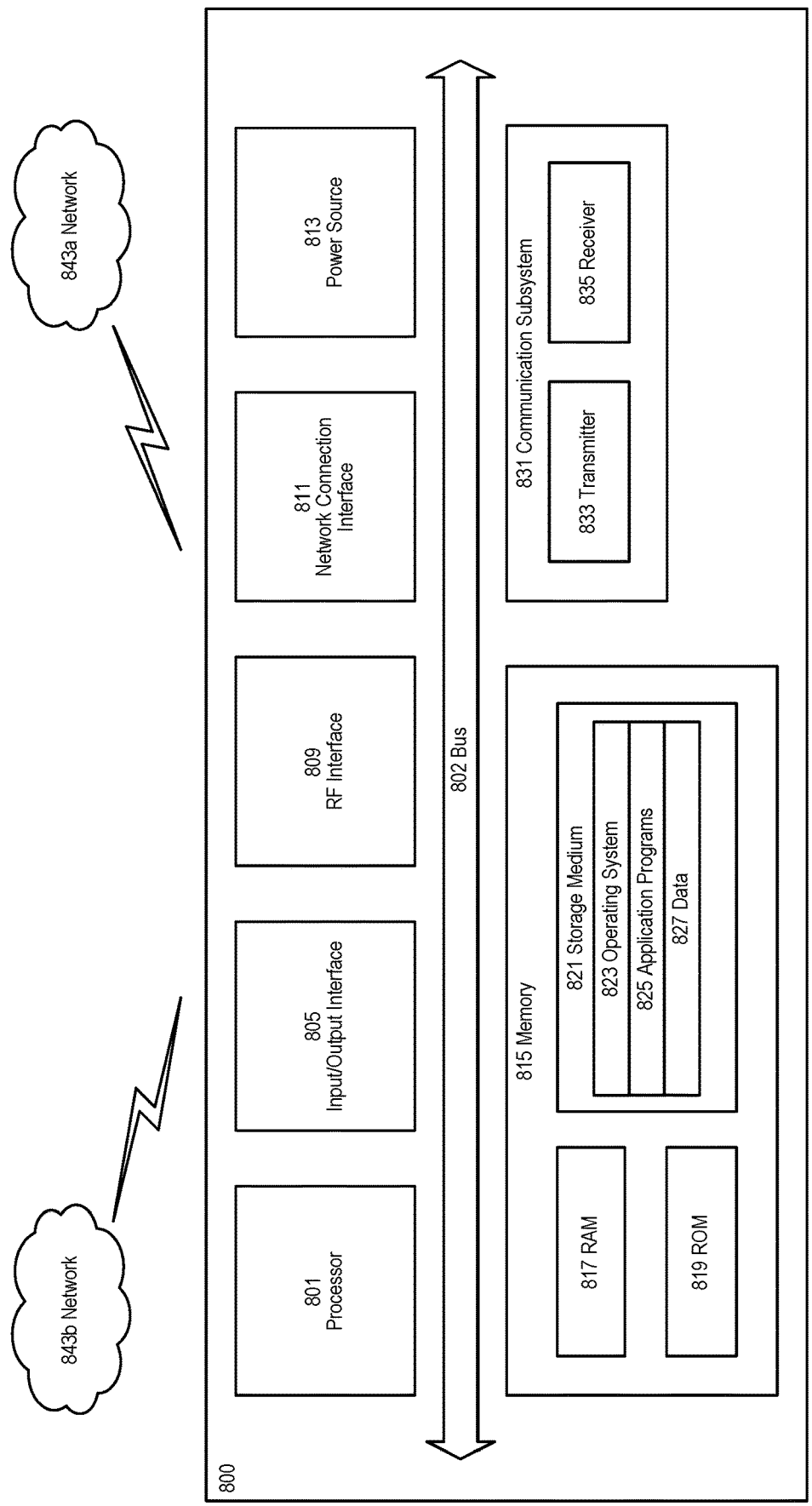
FIG. 8 depicts a user equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 813, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
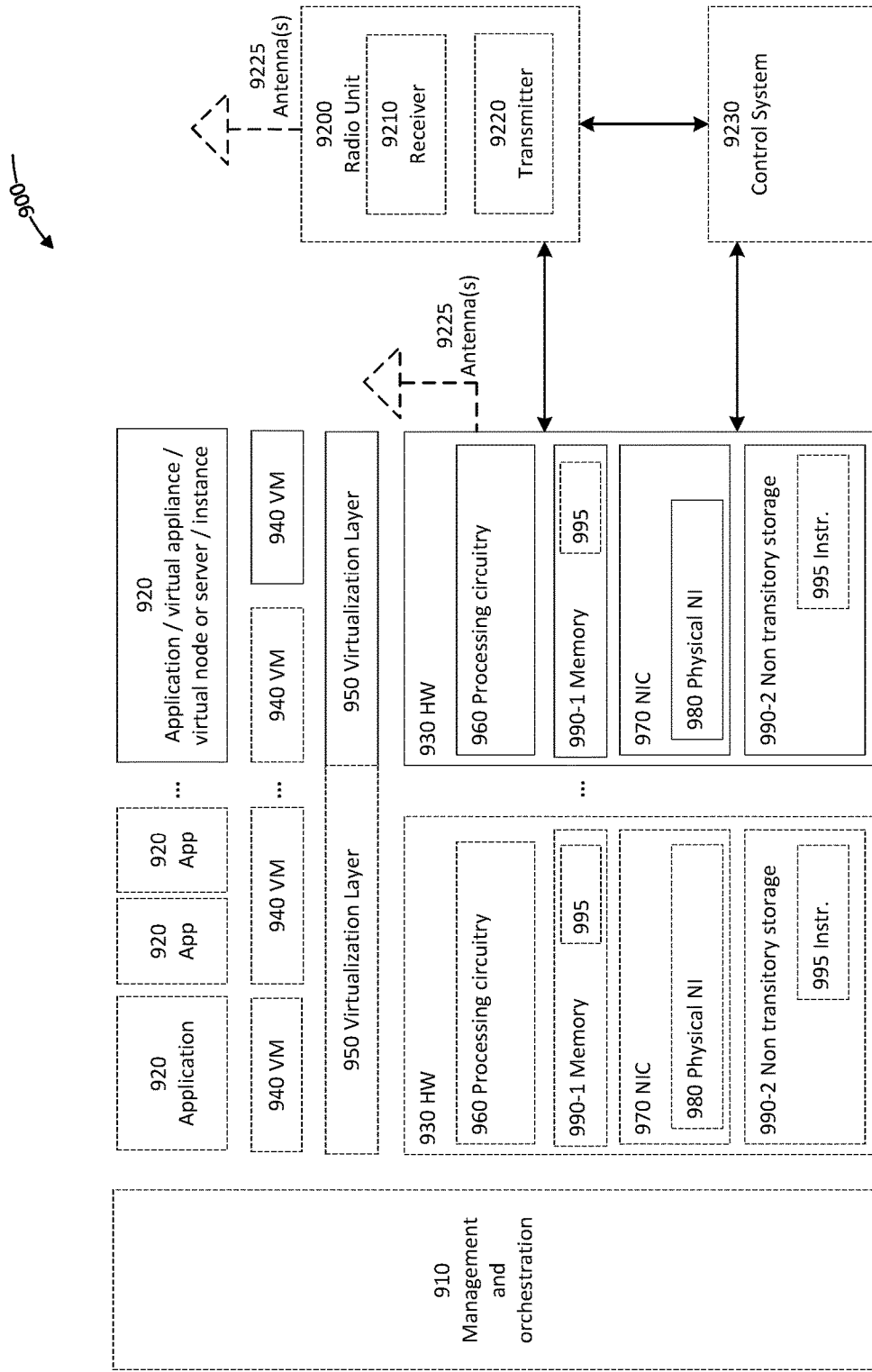
FIG. 9 depicts a virtualization environment in accordance with some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 910, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signaling can be effected with the use of control system 9230 which may alternatively be used for communication between the hardware nodes 930 and radio units 9200.

Figure 10:
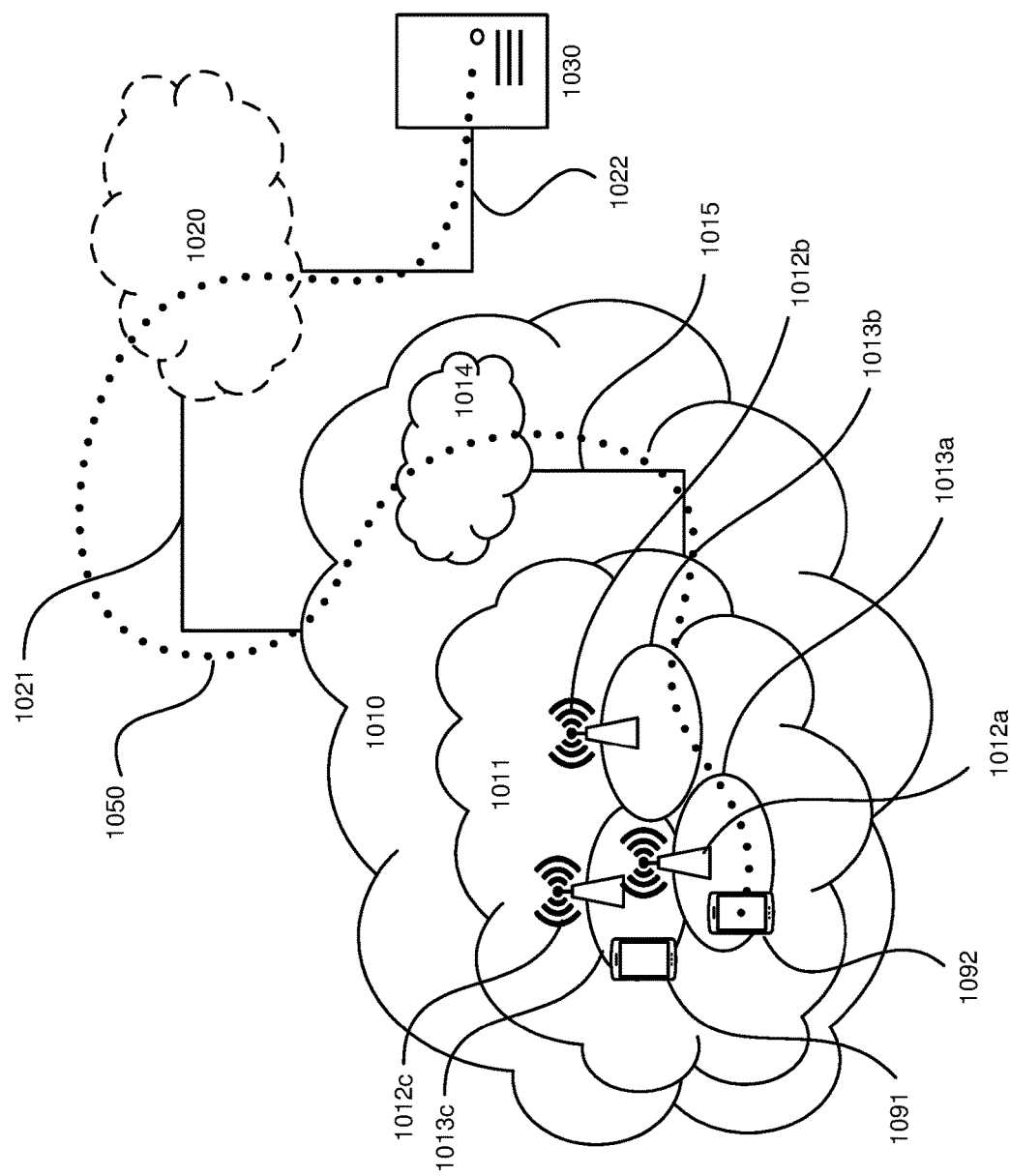
FIG. 10 depicts a network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 10 20. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
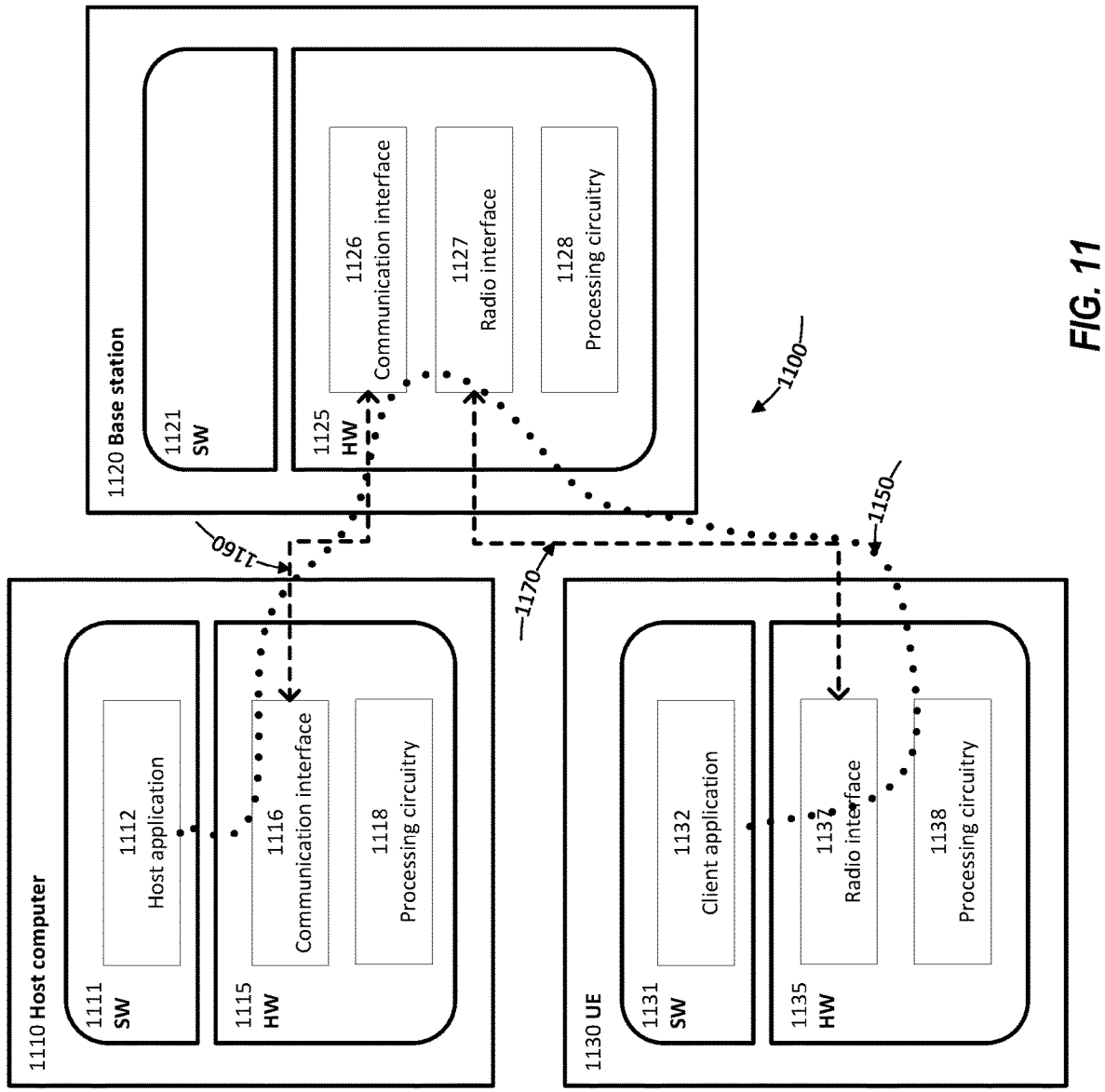
FIG. 11 depicts a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the operation of devices attempting to communicate via a wireless network and which have been misconfigured with an incorrect routing ID and thereby provide benefits such as permitting the correction of such misconfigurations without requiring interventions at a network operators premises.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

5GC 5G Core Network
NF Network Functions
SBA Service Based Architecture
CP Control Plane
SBI Service Base Interface
NRF Network repository function
AMF Access and Mobility Management Functions
AUSF Authentication Server Function
UDM Unified Data Management
UDR: Unified Data Repository
SUPI Subscription Permanent Identifier
SUCI Subscription Concealed Identifier
GPSI General Public Subscription Identifier
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method for redirecting a user equipment with a routing misconfiguration, the method comprising:
   detecting a potential misconfiguration associated with the user equipment or a subscriber identity module (SIM) associated with the user equipment; and
   generating an error code indicating a potential misconfiguration associated with the user equipment or the SIM associated with the user equipment, wherein:
   the error code further indicates that the potential misconfiguration is an incorrect routing identifier,
   the error code includes additional user information,
   the detecting of the potential misconfiguration comprises detecting an unknown or unrecognized subscription identifier associated with the user equipment or the SIM wherein the additional user information comprises a subscription permanent identifier (SUPI) and a new routing ID;
   generating new configuration information based on the received SUPI and the new routing ID,
   querying the network to obtain appropriate configuration information where the user is authenticated and/or registered based on the received SUPI and the new routing ID; and
   configuring the user equipment or the SIM associated with the user equipment with appropriate routing ID.

2. The method of claim 1, further comprising transmitting the error code to an authentication module.

3. The method of claim 1, wherein the additional user information includes a subscription identity associated with the user equipment or the SIM.

4. The method of claim 1, wherein:
   detecting the potential misconfiguration associated with the user equipment or the SIM is performed in response to an access request transmitted by the user equipment.

5. The method of claim 4, wherein:
   an authentication module directs the access request to a first functional module based on the incorrect routing identifier included in the access request.

6. The method of claim 5, wherein:
   the authentication module redirects the access request to a second functional module is based on the generated error code or information included with the generated error code; and
   the second functional module authenticates or registers the user equipment or SIM.

7. The method of claim 6, wherein the first functional module comprises a first authentication server function (AUSF) module and the second functional module comprises a second AUSF module.

8. The method of claim 6, wherein the second functional module comprises at least one of a second AUSF module, a second unified data management (UDM) module, or a second unified data repository (UDR) module.

9. The method of claim 5, wherein the first functional module comprises at least one of a first AUSF module, a first unified data management (UDM) module, or a first unified data repository (UDR) module.

10. The method of claim 5, wherein the authentication module comprises an access and mobility management functions (AMF) module.

11. The method of claim 1, further comprising determining that the user equipment is managed by another network segment within an associated home public land mobile network.

12. The method of claim 1, wherein determining that the user equipment is managed by another network segment comprises performing a check of a subscription permanent identifier associated with the user equipment and or a home network public key identifier associated with the user equipment.

13. The method of claim 12, wherein a private key that matches the home network public key identifier is not present in the network segment.

14. A method for correcting a user equipment or a subscriber identity module (SIM) misconfiguration, the method comprising:
   receiving, via a wireless transmission, a request from a user equipment to connect to a core network;
   selecting an authentication server for authentication of the user equipment based on a routing identifier provided by the user equipment, where in the authentication server is part of a first network segment;
   receiving an error message from the authentication server, the error message indicating that the routing identifier is misconfigured, wherein receiving the error message is in response to a potential misconfiguration associated with the user equipment being detected and the error message contains an error code which further includes additional user information;
   selecting a new authentication server for authentication of the user equipment based on the error message and/or information included in the error message;
   sending an authentication request to the new authentication server for authentication of the user equipment, wherein the new authentication server as part of a second network segment and wherein the potential misconfiguration associated with the user equipment comprises an unknown or unrecognized subscription identifier associated with the user equipment or the SIM, wherein the additional user information comprises a subscription permanent identifier (SUPI) and a new routing ID;
   generating new configuration information based on the received SUPI and the new routing ID, querying the network to obtain appropriate configuration information where the user is authenticated and/or registered based on the received SUPI and the new routing ID; and configuring the user equipment or the SIM associated with the user equipment with appropriate routing ID.

15. The method of claim 14, wherein the authentication request comprises information included in the error message.

16. The method of claim 15, wherein the authentication server generates the error message when a subscription permanent identifier is not resolved by the authentication server or is not found in a unified data repository associated with the authentication server.

17. The method of claim 14, further comprising sending an initial authentication request to the authentication server.

18. The method of claim 17, wherein the authentication server sends a request to an associated unified data management (UDM) instance in response to the initial authentication request.

19. A core network authentication system for authenticating wireless user equipment to a core network, the core network authentication system comprising:

a memory having instructions stored thereon; and processing circuitry, wherein the processing circuitry implements the instructions to perform operations comprising:

detecting a potential misconfiguration associated with the user equipment or a subscriber identity module (SIM) associated with the user equipment; and generating an error code indicating the potential misconfiguration associated with the user equipment or the SIM associated with the user equipment, wherein:

the error code further indicates that the potential misconfiguration is an incorrect routing identifier, the error code includes additional user information, the detecting of the potential misconfiguration associated with the user equipment comprises detecting that a subscription identifier associated with the user equipment or the SIM is unknown or unrecognized, wherein the additional user information comprises a subscription permanent identifier (SUPI) and a new routing ID;

generating new configuration information based on the received SUPI and the new routing ID, querying the network to obtain appropriate configuration information where the user is authenticated and/or registered based on the received SUPI and the new routing ID; and configuring the user equipment or the SIM associated with the user equipment with appropriate routing ID.

20. A core network authentication system for authenticating wireless user equipment to a core network, the core network authentication system comprising:

a memory having instructions stored thereon; and processing circuitry, wherein the processing circuitry implements the instructions to perform operations comprising:

receiving, via a wireless transmission, a request from a user equipment to connect to a core network;

selecting an authentication server for authentication of the user equipment based on a routing identifier provided by the user equipment, where in the authentication server is part of a first network segment;

receiving an error message from the authentication server, the error message indicating that the routing identifier is misconfigured, wherein receiving the error message is in response to a potential misconfiguration associated with the user equipment being detected and the error message further contains an error code which includes additional user information;

selecting a new authentication server for authentication of the user equipment based on the error message and/or information included in the error message;

sending an authentication request to the new authentication server for authentication of the user equipment, wherein the new authentication server as part of a second network segment and wherein the potential misconfiguration associated with the user equipment comprises an unknown or unrecognized subscription identifier associated with the user equipment or the SIM, wherein the additional user information comprises a subscription permanent identifier (SUPI) and a new routing ID;

generating new configuration information based on the received SUPI and the new routing ID, querying the network to obtain appropriate configuration information where the user is authenticated and/or registered based on the received SUPI and the new routing ID; and configuring the user equipment or the SIM associated with the user equipment with appropriate routing ID.

* * * * *